Oct. 14, 1924.

D. C. KLAUSMEYER

DISK CLUTCH REVERSER 1,512,007

Original Filed May 28, 1921    2 Sheets-Sheet 1

Inventor
D. C. Klausmeyer

Attorney
Albert F. Nathan

Oct. 14, 1924.

D. C. KLAUSMEYER 1,512,007

DISK CLUTCH REVERSER

Original Filed May 28, 1921   2 Sheets-Sheet 2

Inventor
D. C. Klausmeyer
By Attorney
Albert P. Nathan

Patented Oct. 14, 1924.

1,512,007

UNITED STATES PATENT OFFICE.

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO.

DISK-CLUTCH REVERSER.

Original application filed May 28, 1921, Serial No. 473,323. Divided and this application filed August 9, 1924. Serial No. 731,109.

*To all whom it may concern:*

Be it known that I, DAVID C. KLAUSMEYER, a citizen of the United States, and residing at Cincinnati, in the county of Hamilton and State of Ohio, have invented a new and Improved Disk-Clutch Reverser, of which the following specification is a full disclosure.

Figure 4:
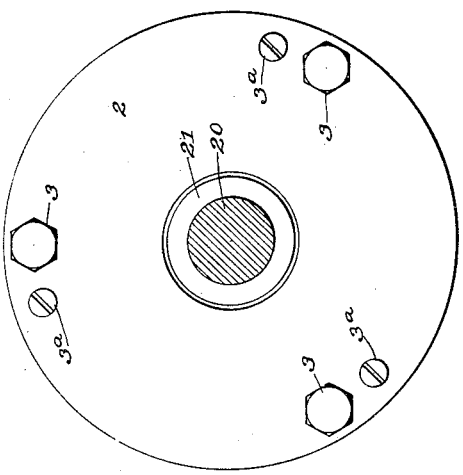

This invention relates to motion-reversers of the type having a plurality of friction disks and is derived from the structure providing tooth-mesh adjustments disclosed by Fig. 4 of my pending application (of which this is a division) Serial No. 473,323, filed May 28, 1921, and patented on August 12, 1924, No. 1,505,074.

It is, accordingly, an object of this invention to provide a motion-reverser in the nature of a unit in combination with a shaft freely translatable relatively to the unit and in which the operating elements will be mounted (independently in the shaft) on a rotatable sleeve journaled at its ends in fixed portions or end-walls of the frame and in which the gears will be very compactly nested and arranged to transmit power through friction clutches of the disk-type mounted on the end portions of the rotatable sleeve; together with an instrumentality for connecting either one or the other of the coaxial gears with the sleeve by means of a compactly mounted manually operative clutch actuator.

In achieving the general objects above noted, this divisional invention seeks also to provide easily operable means for compensating for wear of the teeth of the bevel gears whereby they may be adjusted in position and relationship from time to time so that the pitch-lines of the three gears may be maintained accurately in coincidence and thus promote smooth running in said gears and keep the wear at a minimum.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
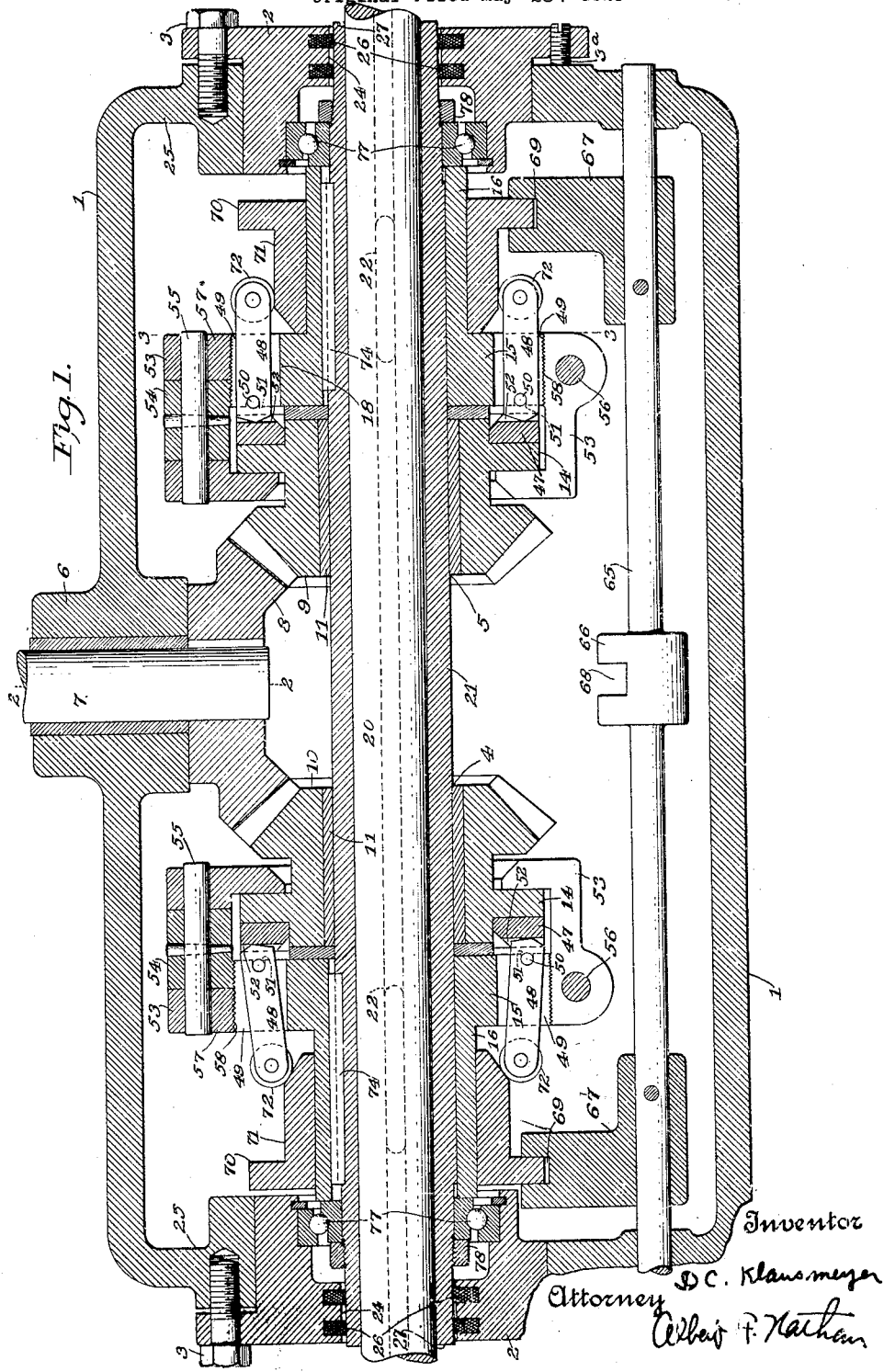
Figure 2:
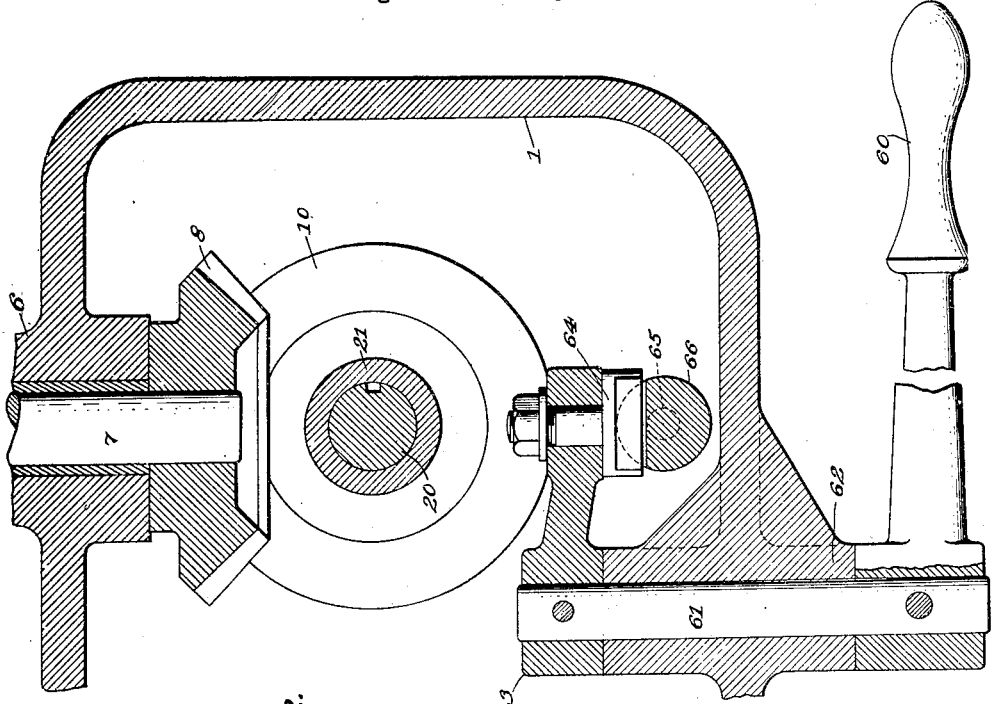
Figure 3:
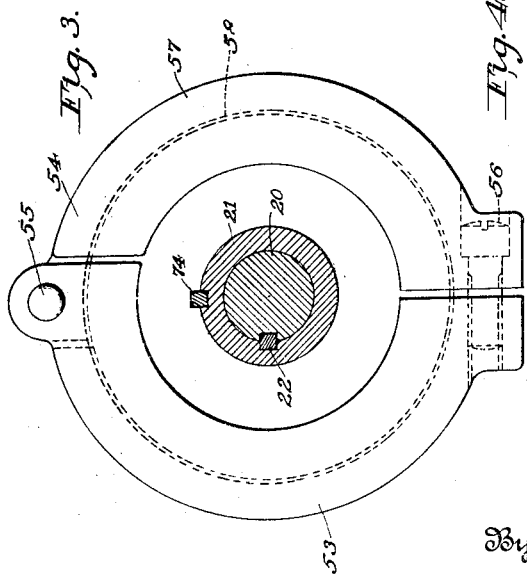

Fig. 1 is a longitudinal section showing the general assembly of the elements of this device and of the gear-adjusting means. Fig. 2 is a transverse section taken along a medial of Fig. 1 showing the arrangement of the lever for operating the clutches. Fig. 3 is a section through line 3—3 of Fig. 1; certain parts being omitted. Fig. 4 is an end view of the adjustable bearing-cap.

Continuing now by way of an analysis of the herein illustrated examples of this invention, 1 indicates a frame for supporting and positioning the major elements of the device. While this frame may be open, it will be formed in the nature of a closed casing in the preferred aspect of this invention, so that the various bearings may be shielded against grit and may be run in a bath of oil or grease. This frame is characteristically provided with means for providing stationary journals for the mounting of the ends of a rotating sleeve which in turn supports two conversely-rotating bevel-gears. A convenient way of achieving that end is illustrated in Figs. 1 and 4, wherein 2 indicates a bearing-cap adjustably mounted on an end-wall of the casting; it being adjustably yet firmly affixed thereto by screws 3 and 3ª.

The casing 1 is provided with a bearing 6 located intermediate the ends of the rotatable sleeve 21 and this receives a shaft 7 having affixed to its inner end a bevel-gear 8 which, accordingly, faces the rotatable sleeve 21 substantially midway its ends. Mounted on the journals 4 and 5, are two bevel-gears 9 and 10 which are in mesh with the bevel-gear 8, as shown by Fig. 1. As will be understood, the effect of this intermesh is to urge the gears 9 and 10 away from the axis 2—2 of the shaft 7 and, in order to limit this movement, suitable thrust-limiting means are provided adjacent of outer faces of the gears 9 and 10. These gears are rotatably, as well as translatably, mounted on the journal portions 4 and 5 (as for example through the agency of the brass bushings 11) so as freely to admit of lateral movement against the said thrust bearing.

In the course of time, sufficient wear will take place to impair the original precision of the intermesh and, therefore, provision is made for adjusting the gears toward the axis line 2—2. To that end, the cap 2 is telescoped in the end of the stationary frame 1 so that it may be adjusted towards the axis line 2—2; a thrust bearing 77 (preferably of the ball type) being interposed for the purpose of decreasing friction and wear. Inasmuch as both the gears 9 and 10 are journaled on a single element, they admit of being held very closely in an accurate coaxial relation; there being no intervening loose elements to impair the precision of the mount.

The gear 9 is of small diameter and its bore is comparatively small so that, while permitting the gear 8 to be set close to the central axis of the spindle, it will nevertheless run smoothly. While such gear may have its outer portion configurated in any manner appropriate to the type of clutch used, it will be noted that the example illustrated presents a very desirable characteristic; to wit, it merely has a simple disklike flange 14 of small diameter formed on its end.

This flange 14 may be regarded as the male member of the clutch or, as a matter of nomenclature, the clutch may be referred to as consisting of the various movable and adjustable elements comprising the separate unit now to be described. This device comprises a body proper 15 having a hub 16 in the form of a sleeve.

The general object of motion reversers of the sort in view, is to enable motion to be transmitted from a shaft 7 to another shaft 20 arranged at an angle thereto; usually in the same axial plane therewith and usually also at right-angles thereto, but not necessarily so. The shaft 20, however, must admit of being translated in an axial direction relative to the shaft 7 without any break in the connection but otherwise accurately preserving the spatial relations between the two. The shaft 20 is, accordingly so journaled (either directly or indirectly) with respect to the frame that the aforesaid relation will be preserved, and also so connected (either directly or indirectly) with the clutch as to preserve the driving relation in all of its positions. The former may be achieved indirectly by resorting to an intervening sleeve arranged, on the one hand, to serve as a bearing for the shaft and being, on the other hand, itself journaled in the end walls of the casing. Thus, as shown by Fig. 1 the elongated tubular sleeve 21 is splined to the shaft 20 by means of the key 22, and is also (as by means of bearings 77) journaled at its ends within a fixture or part of the casing. These bearings 77 are located near the ends of the fixed sleeve, as shown, so as to ensure accuracy in alignment and, in case a closed casing be used, the rotary sleeve preferably will extend into openings 24 in either the adjustable cap 2 or directly in the end-walls 25 thereof to make provision for dust-guards 26 in the nature of packing adapted to prevent undue leakage of the lubricant. The end-portion 27 of the rotary sleeve may also be journaled directly in said openings if desired to ensure the alignment and, to restrict the end-play, nut 78 (screw threaded to the rotary sleeve) bears against the clutch member 16 through the interposed ball bearing 77 thereby keeping the rotary sleeve in place and providing a slight float. The thrust-bearing 77 may be of the form shown in Fig. 1 and wear may be compensated for by a turning of the screws 3 and 3$^a$. As shown by Fig. 1 the ball bearing 77 carries both the thrust and the side strains and adjustment is also afforded by a collar 78 screw-threaded to the end-portion of the sleeve and located in a socket in the cap 2.

As has been stated, this invention admirably admits of the use of disk-clutches, as for example of the construction shown. Here, the clutch comprises an annular shoe 47 arranged adjacent the annular flange 14 of the gear. This shoe 47 is urged against said flange by means of several symmetrically arranged levers 48 arranged in slots 49 cut in the periphery of the portion 18 and positioned by means of pivot-pins 50 secured to the levers and projecting from the sides thereof; the projecting ends of the pivot-pins being seated in a recess 51 cut in the face of the flange 18. The inner end of the lever rests against the side of the shoe 47; preferably in a notch 52 so as to prohibit any rotation of the shoe relative to the clutch-member 15.

The thrust resulting from the pressure of the shoe is, on the other side of the flange 14, resisted by an annular member which, for ease of assembly, may be made, as shown by Fig. 3, of two half-rings 53 and 54 hinged together by the pin 55 to form a complete circle. These half rings have flanges 57 that are interiorly screw-threaded, as indicated by 58, so as to be adjustably affixed to the flange 18 of the clutch-member 15. A screw 56 serves to bind the parts securely in place, as will be understood.

It will be noted that the clutch-parts are capable of a slight float or movement as a unit in an axial direction so that a degree of self-adjustment in conformity with the position of the flange 14, is thereby provided; thus avoiding the "drag" sometimes exhibited by faulty clutch designs.

To operate the clutches, a hand-lever 60 (Fig. 2) is affixed to a stub-shaft 61 journaled in a boss 62 provided by the frame or casing. To the inner end of such shaft 61, is affixed a lever 63 having a shoe 64 pivoted to its end and seated in a recess 68 provided by an enlargement 66 on the shift-rod 65. The latter is shown supported at its ends in the end-walls of the frame and it carries a member 67 having a slot 69 engaging a flange 70 projecting from a conical lever-actuator 71 which, when moved laterally, may engage rolls 72 on the ends of the levers and operate the clutches, as will be perceived.

The simplicity and compactness of the above revealed organization is especially noteworthy and it will be seen that it overcomes certain troublesome features of previous designs and is rugged and not likely to become disarranged in use and may be assembled readily and subsequently adjusted as occasion demands to maintain accuracy and smoothness of action.

Without further analysis, the foregoing will so fully reveal the gist of this invention that others can, by applying current knowledge, readily adapt it for various utilizations without omitting certain features that, from the standpoint of the prior art, fairly constitute essential characteristics of the generic or specific aspects of this invention, and therefore such adaptations should be and are intended to be comprehended within the meaning and range of equivalency of the following claims.

Having thus revealed this invention, I claim as new and desire to secure the following combinations and elements, or equivalents thereof, by Letters Patent of the United States:—

1. A motion-transmitter combining a clutch unit presenting an open end having an internal annular recess; a gear having an annular flange at the end of its hub located in said annular recess; an annular shoe adjacent the outer face of said flange; a pressure element for clamping said gear flange between said shoe and a side-face of said annular recess; a tubular member on which said gear is journaled; a frame providing journals for the ends of said tubular members; an axially-shiftable shaft translatably splined within the bore of said tubular member; and means for adjusting the position of said gear on said tubular-member.

2. A motion-transmitter combining two conversely arranged mechanisms, each comprising a gear having an annular flange; a shiftable body-member presenting an annular brake-shoe adjacent a side-face of said flange; a member adjustably mounted on said body-member and having a flange adjacent the other side-face of the gear-flange; a lever carried by one of said members and adapted to urge said shoe against said gear-flange; a rotatable sleeve supporting said parts; a frame providing bearings for the ends of said sleeve; two spools shiftable on said sleeve for alternately operating said levers; hand-operated mechanism mounted by said frame for alternately shifting said spools; a bevel-gear permanently meshing with said two gears; and means for adjusting the distance between said two gears.

3. A motion-reverser combining a frame; a rotary sleeve journaled in the end-walls of said frame; a shaft splined to and translatably extending through said sleeve; a bevel-gear facing said sleeve; two oppositely arranged bevel-gears meshing with said first gear and each journaled to rotate on the respective ends of said sleeve and out of contact with said shaft, each of said two gears having on its outer end an annular double-faced friction disk; means for adjusting the spacing of said two gears; a first clutch element operatively connected to said sleeve and arranged adjacent the outer end of a gear and having an annular face adjacent one side of said disk; a second clutch element having an annular face movable against the other face of said disk; a lever for effecting a relative movement of said clutch-elements; and mechanism for alternately engaging either clutch with its associated gear.

4. A motion-reverser combining a frame; an elongated sleeve journaled at its ends in portions of said frame; a shaft translatably extending through said sleeve; and splined thereto a bevel-gear facing said sleeve; two oppositely arranged bevel-gears meshing with said first gear and each journaled to rotate on the respective end-portions of said sleeve and out of contact with said shaft; means for adjusting the spacing of said two bevel-gears; an annular disk-like brake-element provided by each gear; two clutches operatively connected to said shaft and each arranged adjacent the outer ends of said gears, respectively, said clutches providing two annular jaws for clamping therebetween the associated disk-like brake-element; and means for alternately engaging either clutch with its associated gear.

5. A motion-reverser combining a frame; an axially-translatable rotary-shaft; two oppositely-disposed gears spaced apart in concentric relation with said rotary shaft; a sleeve journaled at its ends in said frame and providing journals for rotatably supporting said gears out of contact with said rotary shaft; means for adjusting the positions of said gears on said sleeve; two disk-type clutches mounted directly on said rotary sleeve adjacent the outer end of each gear, respectively; each of said gears providing a double-faced disk and each clutch comprising two annular jaw-like surfaces adapted to be closed to clamp therebetween said disk; and means embodying a lever pivoted transversely to the axis of said shaft for establishing a driving relation between either of said gears and its associated clutch.

6. A motion-reverser combining a shaft; two oppositely-disposed gears spaced apart in concentric relation with said shaft; a non-shiftable rotatable sleeve providing rotary journals for supporting said gears out of contact with said shaft; a frame, said sleeve being journaled at its ends in the end-walls of said frame; a disk-type clutch located on said sleeve adjacent each gear; a collar concentric with said sleeve adjacent said clutch; means for shifting said collar relative to said sleeve for establishing a driving relation between either of said gears and its associated clutch; and means for adjustably shifting said gears on said sleeve.

7. A motion-reverser combining a frame; a non-translatable sleeve rotatably supported at its ends thereby; a shaft translatably extending through said sleeve; a bevel-gear facing said sleeve; two oppositely arranged bevel-gears meshing with said first gear and each journaled to rotate on the respective ends of said sleeve and out of contact with said shaft, each of said opposed bevel-gears having a two-faced flange; means for adjusting the relationship of said gears to compensate for wear; two clutch-members splined directly to said sleeve and shiftable thereon and located adjacent the outer ends of said gears, respectively; each of said clutch-members comprising two jaw-like parts each adapted to move slightly in an axial direction relative to said sleeve; and means for relatively moving said parts for connecting either clutch-member with its associated gear, said means being adapted to operate said clutch-members alternately.

In witness whereof, I hereunto subscribe my name, as attested by the two subscribing witnesses.

DAVID C. KLAUSMEYER.

Witnesses:
C. C. SLETE,
HILDA HERBERS.